A. H. GLEDHILL.
APPARATUS FOR RELEASING BODIES FROM AIRCRAFT.
APPLICATION FILED AUG. 1, 1918.

1,338,724.

Patented May 4, 1920.
8 SHEETS—SHEET 1.

A. H. GLEDHILL.
APPARATUS FOR RELEASING BODIES FROM AIRCRAFT.
APPLICATION FILED AUG. 1, 1918.
1,338,724.
Patented May 4, 1920.
8 SHEETS—SHEET 2.
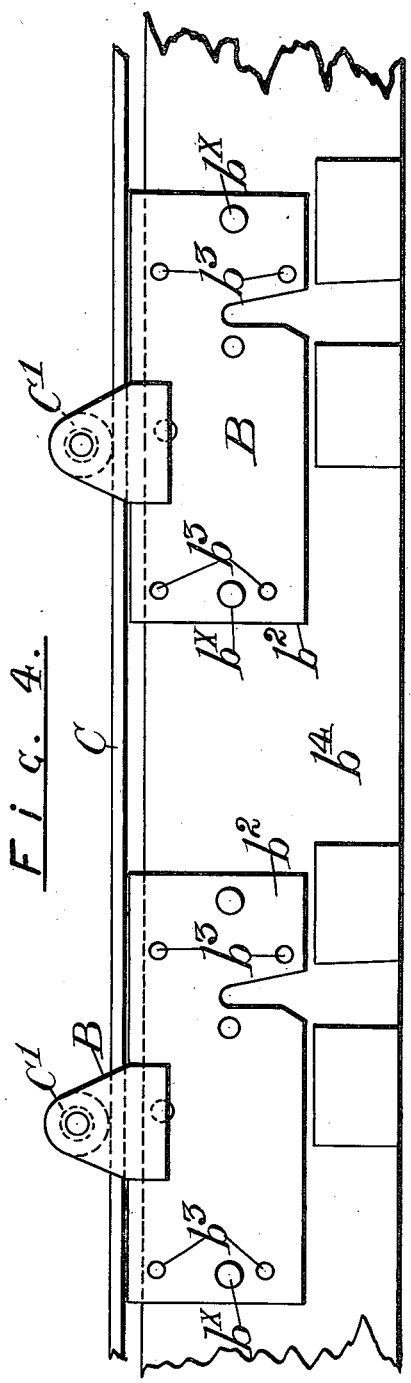
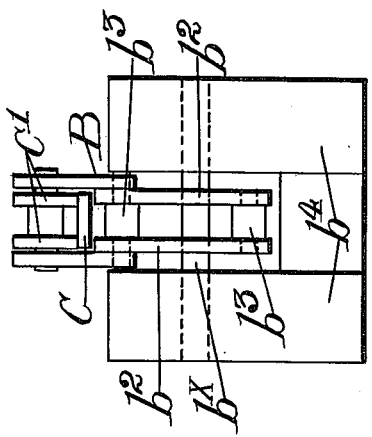

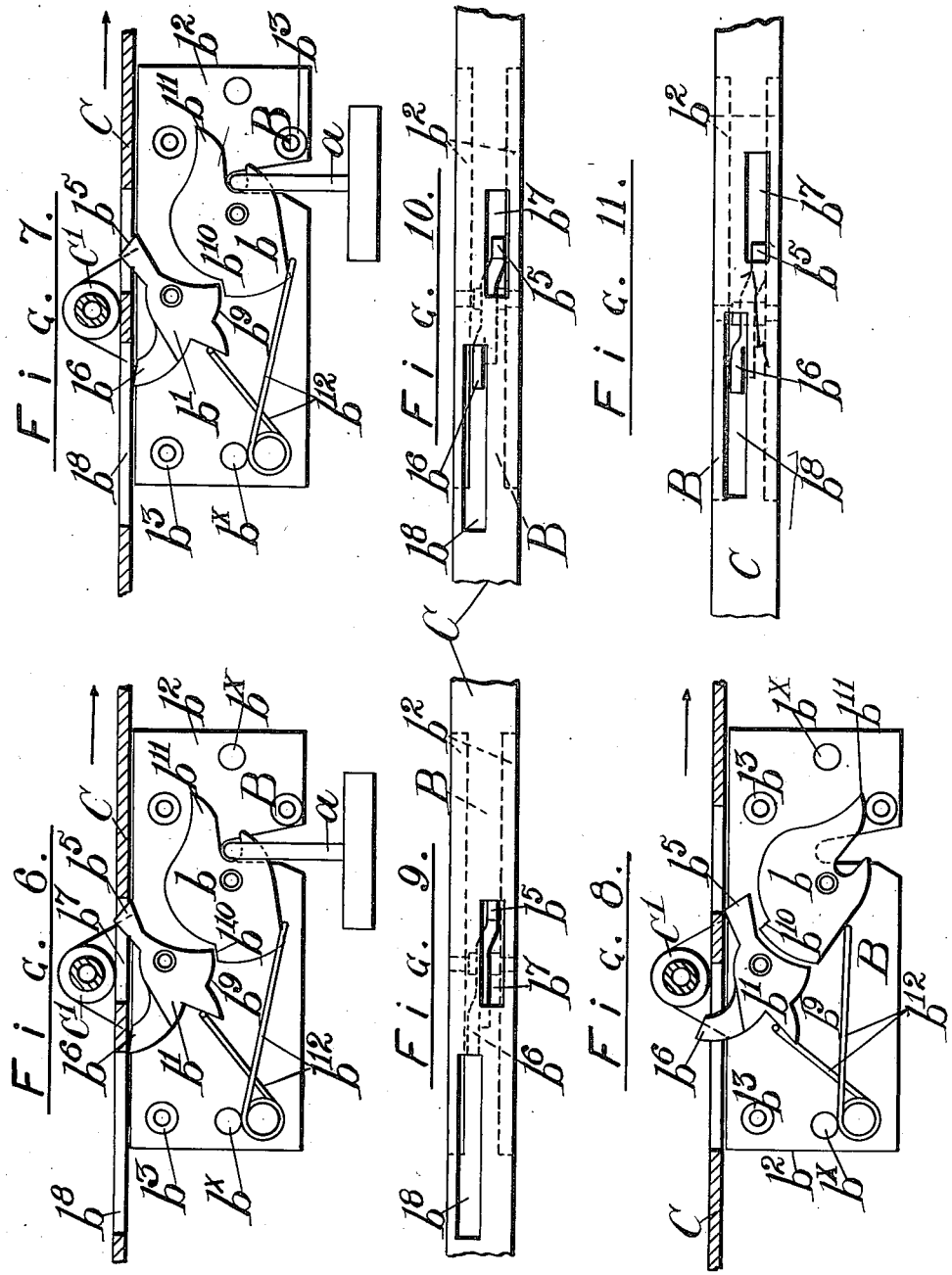

A. H. GLEDHILL.
APPARATUS FOR RELEASING BODIES FROM AIRCRAFT.
APPLICATION FILED AUG. 1, 1918.
1,338,724. Patented May 4, 1920.
8 SHEETS—SHEET 4.
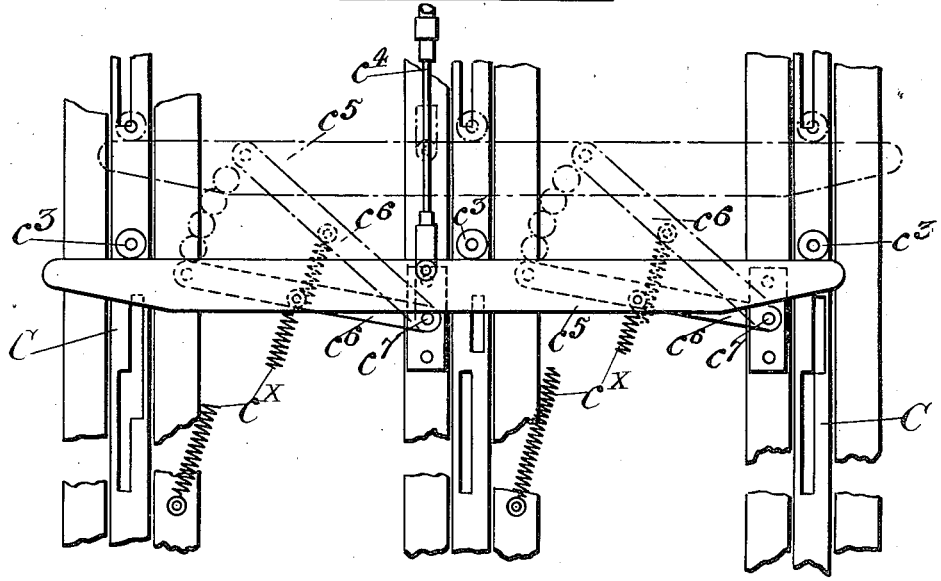
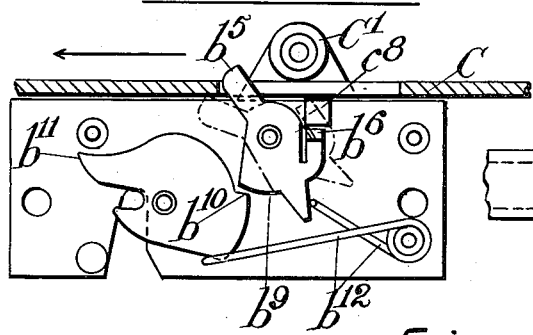
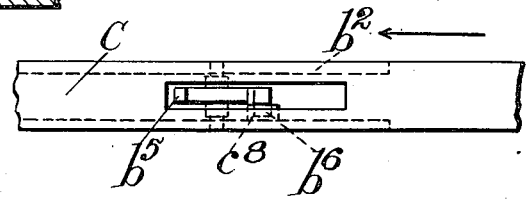
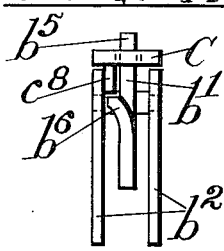

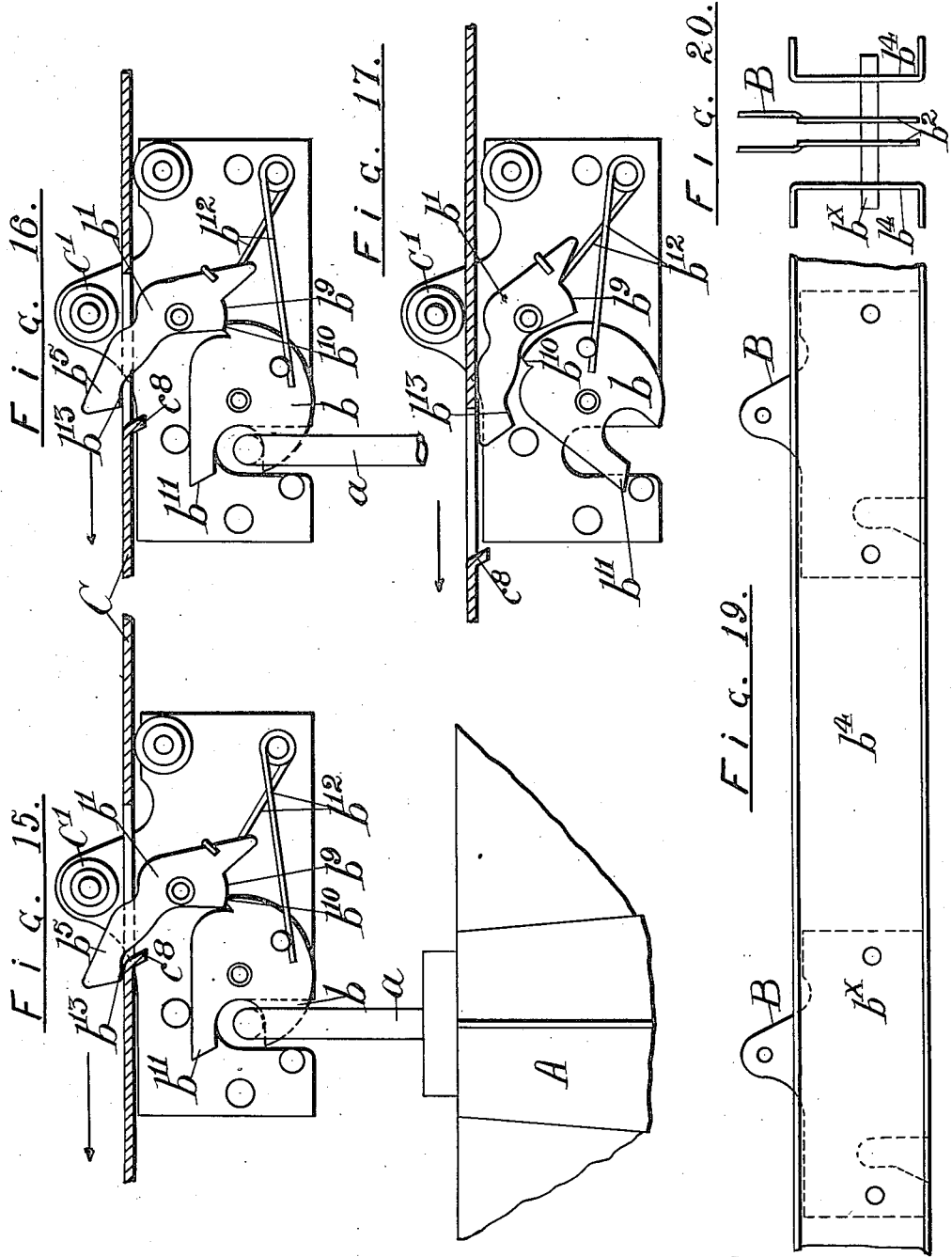

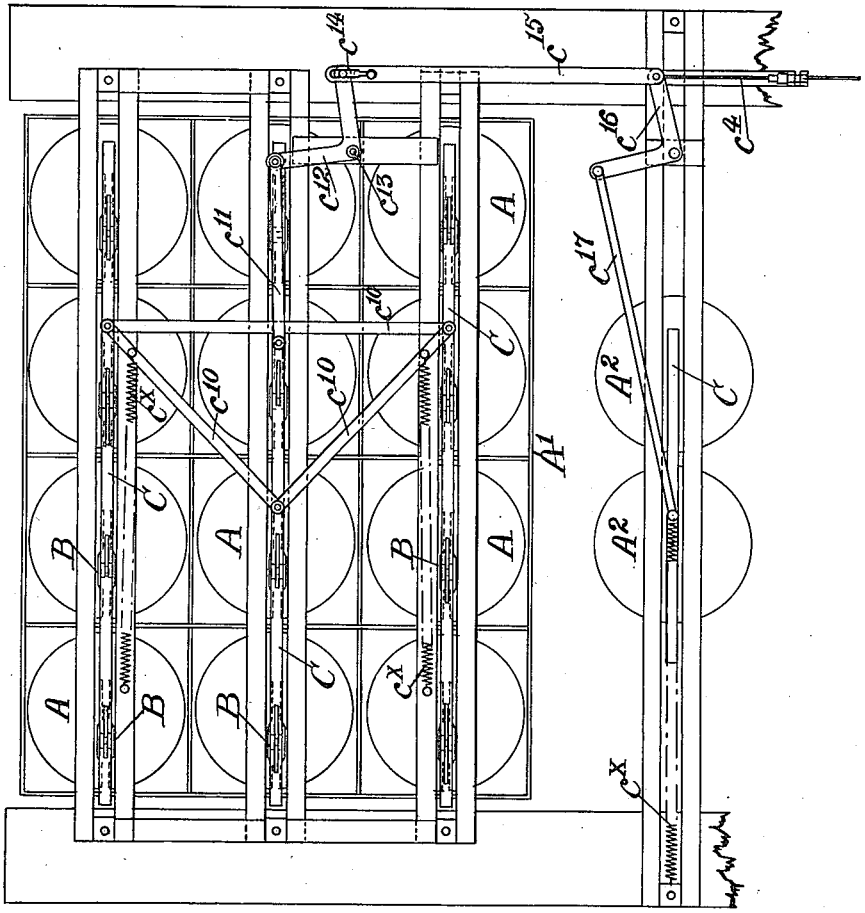

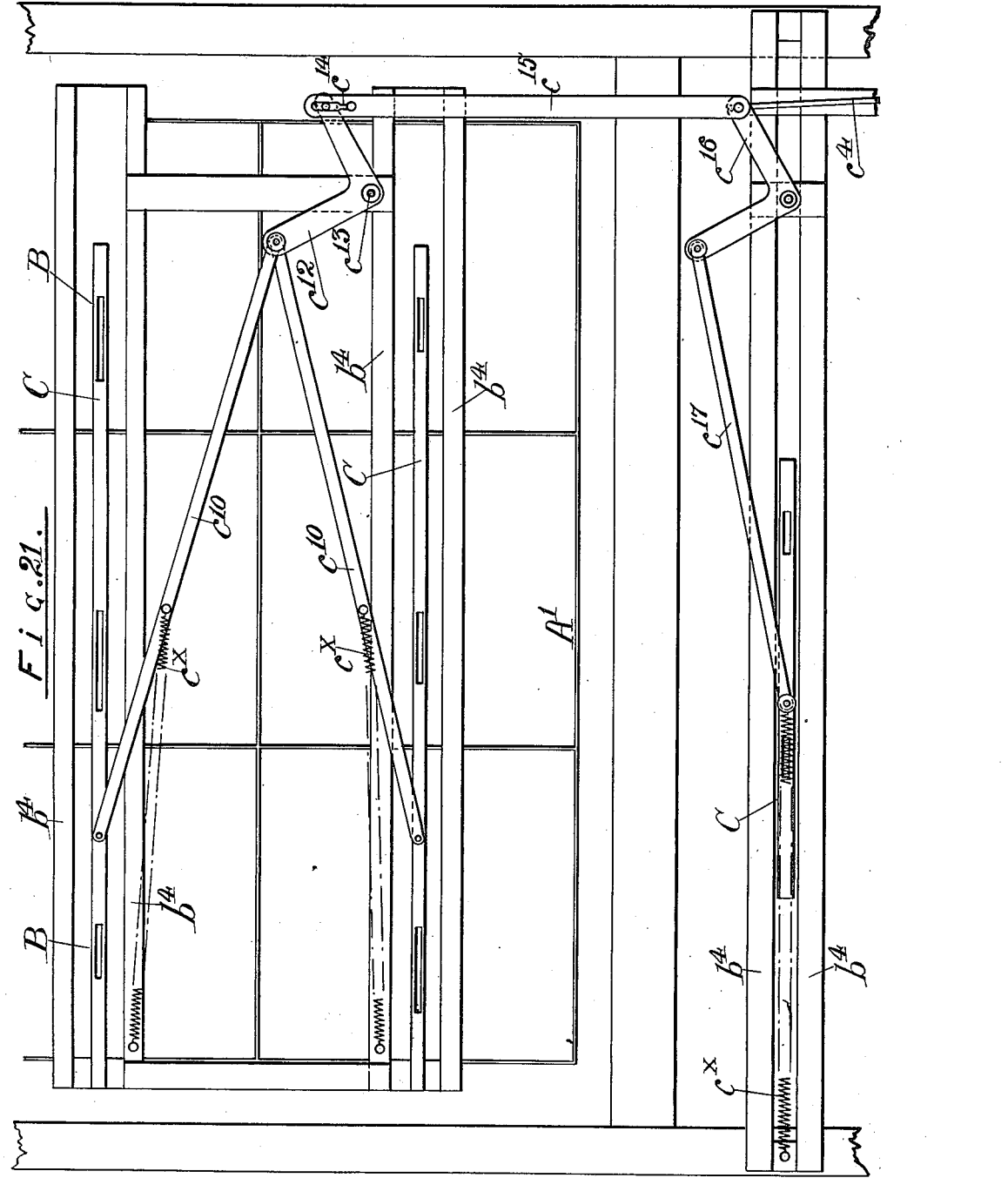

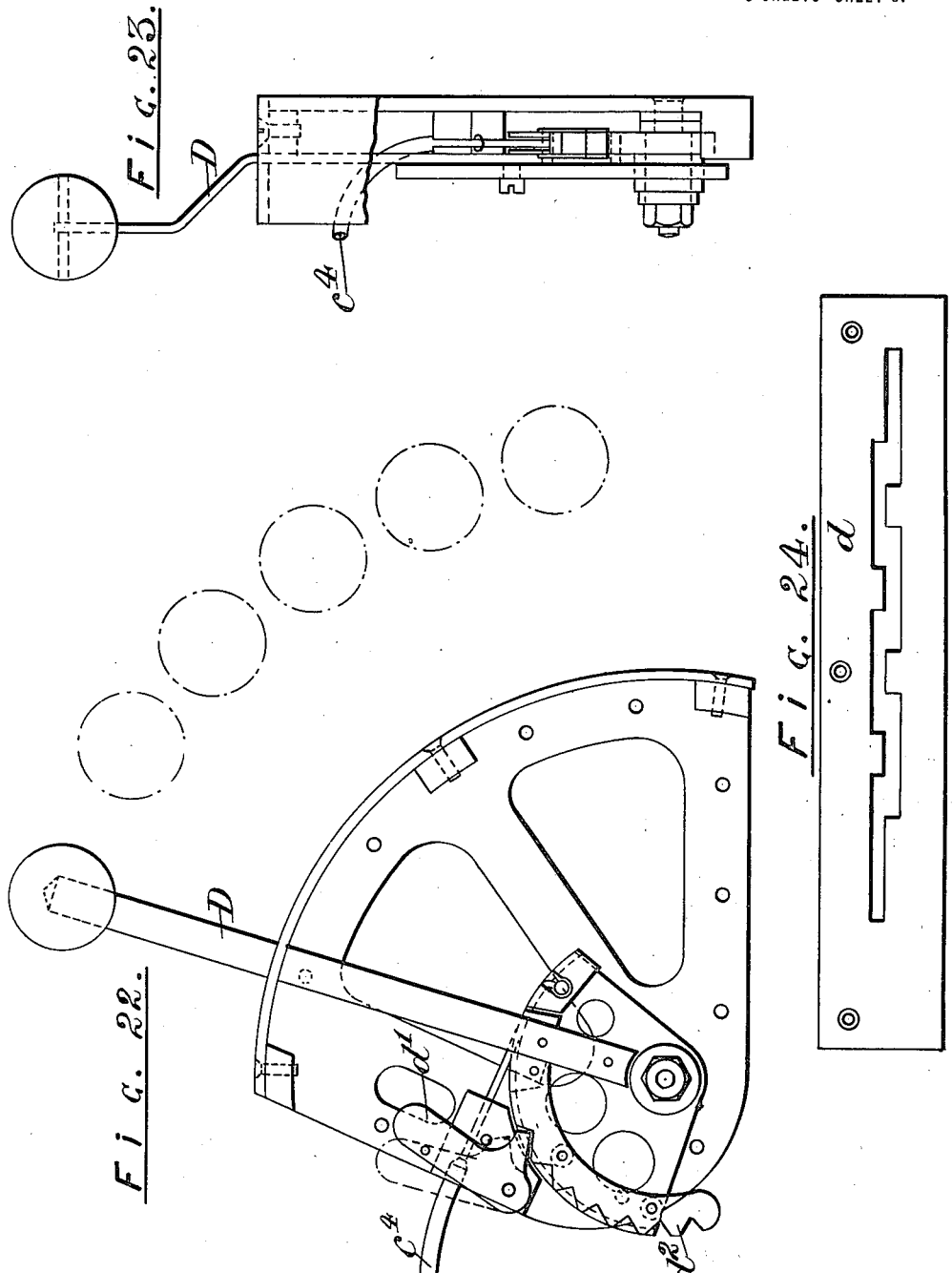

UNITED STATES PATENT OFFICE.

ARTHUR HENRY GLEDHILL, OF HALIFAX, ENGLAND.

APPARATUS FOR RELEASING BODIES FROM AIRCRAFT.

1,338,724. Specification of Letters Patent. Patented May 4, 1920.

Application filed August 1, 1918. Serial No. 247,875.

*To all whom it may concern:*

Be it known that I, ARTHUR HENRY GLEDHILL, a subject of the King of Great Britain, residing at Trinity Works, Halifax, in the county of York, England, have invented certain new and useful Improvements in Apparatus for Releasing Bodies from Aircraft, of which the following is a specification.

This invention relates to flying machines such as are provided with apparatus for carrying a number or battery of bombs, parcels, mail bags or other bodies (hereinafter referred to as bombs), adapted to be released successively or at intervals. These bombs are usually suspended in a case containing a number of cells, one for each bomb and the cell cases are made interchangeable to carry different weights of bombs, for example, one cell case might contain twelve cells arranged to carry twelve 20 lb. bombs and another cell case might contain six cells to carry six 50 lb. bombs.

In apparatus of this class it has been customary to release the bombs singly and the present invention consists in providing means whereby any predetermined number of bombs can be released at will and in any predetermined order, the numbers released being advantageously so arranged in relation to one another that each release does not materially affect the balance of the machine. For this purpose the bombs are suspended from releasing and locking apparatus actuated by timing slides to which motion is imparted from a control member, a preferred construction consisting in connecting the slides together by links or plates so arranged as to give a triangular, or four point suspension to prevent any one slide from being moved in advance of another and thereby insuring accurate timing of the releases, the central point of suspension being connected to an arm of an L lever of which the other arm is adapted to be connected with the control member. To render the apparatus interchangeable all the L levers are made the same size and occupy the same relative positions in each cell case so that they can be coupled up to the control member without making any adjustment.

In the accompanying drawings:—

Fig. 4 is an elevation drawn to a larger scale of a portion of one of the beams showing the locking and release units and timing slides in position.

Fig. 5 is an end view of the beam drawn to the same scale with a locking and release unit in position.

Figs. 6, 7, and 8 are sections of a locking and release unit showing the parts in the locked, free and releasing positions respectively.

Figs. 9, 10, and 11 are plans of the locking and release mechanism shown in Figs. 6, 7, and 8.

Fig. 12 shows a modified form of slide actuated apparatus drawn to a smaller scale.

Figs. 13, 14 and 14$^A$ show a slightly different construction of locking and releasing lever and slide.

Figs. 15, 16 and 17 show a further development of this construction.

Fig. 18 is a plan of an interchangeable bomb release gear for use in connection with a cell case adapted to contain twelve 20 lb. bombs.

Fig. 19 is an elevation and Fig. 20 an end view of a portion of one of the metal beams with the locking and release units in position.

Fig. 21 is a plan of a bomb release gear for use in connection with a cell case to contain six 50 lb. bombs and made interchangeable with the gear shown in Fig. 18.

Figs. 22, 23, and 24 show a form of control apparatus for the release gears shown in Figs. 20 and 21.

A, A, indicate the bombs, A$^1$ indicates the cell case, B, B, indicate the locking and release units, C, C, the timing slides and D the control member.

Figure 1:
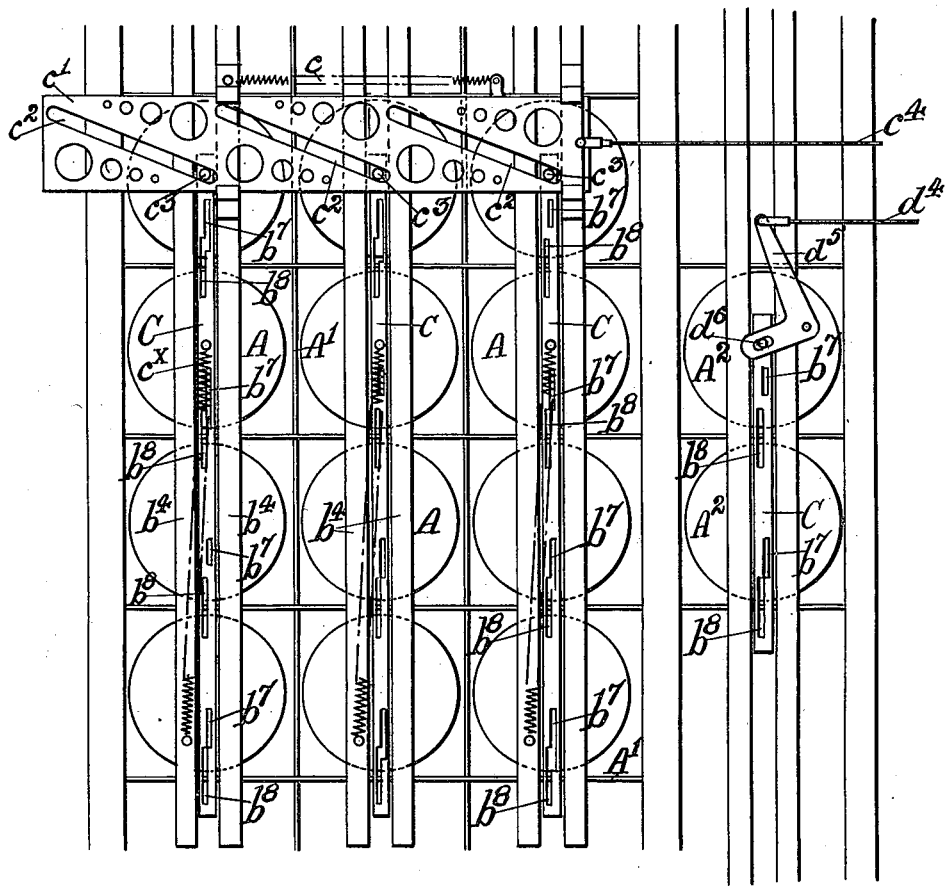
Figure 1 is a plan of a form of bomb release gear constructed in accordance with this invention, the locking and release units being omitted for the sake of clearness.
Figure 2:
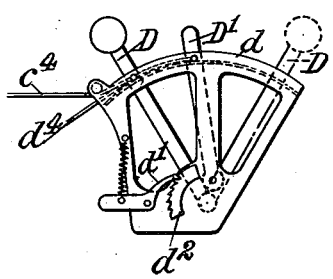
Fig. 2 is an elevation of a form of control apparatus.
Figure 3:
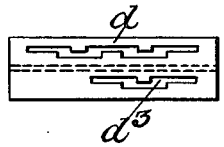
Fig. 3 is a plan of the gate plate used in Fig. 2.

In Fig. 1, the release gear is shown applied to a cell case adapted to contain 12 bombs arranged to be released three at a time, and two other bombs A$^2$, A$^2$ termed "sighting bombs" arranged to be released singly. Three rows of bombs are shown with four in a row and each bomb is provided with a separate locking and release unit B (Figs. 4 to 11). Each row of bombs is controlled by a slide C operatively connected with the locking and release units appertaining to the bombs in that row and all the slides are moved simultaneously step by step in an endwise direction against the action of springs $c^x$ by a sliding plate $c^1$ arranged transversely to the slides and having inclined slots $c^2$ engaging studs or runners $c^3$ on the slides. The sliding plate $c^1$ is connected by a Bowden wire $c^4$ to the control member D. This member comprises a lever working in a slotted gate plate $d$ which causes a step by step movement to be imparted to the lever D, sliding plate and slides, accidental return movement of the control lever from any of its positions being prevented by a pawl $d^1$ engaging a ratchet $d^2$ on the lever. In this example the slide appertaining to the sighting bombs $A^2$ is actuated by a separate lever $D^1$ working in a slot $d^3$ in the gate plate $d$ and connected with the slide by a Bowden wire $d^4$ and L lever $d^5$ which is slotted to engage a runner $d^6$ on the slide. The locking and release units (Figs. 4-11) work on a similar principle to those described in my pending applications for Letters Patent No. 9009/17 in cognate with 5786/17 and each unit comprises a bomb suspending hook or lever $b$ and a combined locking and releasing lever $b^1$ pivotally mounted between two side plates $b^2$ which are connected together by distance pieces $b^3$ and supported between two beams $b^4$ by pins or rivets $b^x$ which pass through the beams and side plates. In Figs. 1, 4, 5, and 12 the beams are shown constructed of wood although they may be constructed of metal such as sheet steel as shown in Figs. 19 and 20. An operative connection between the locking and releasing levers $b^1$ and the slides C may consist in forming in the latter a series of timing slots of varying lengths or shapes to receive abutments in the locking and releasing levers and cause same to be operated at the required times to release in the desired order the hook levers $b$ from which the bombs are suspended. This is effected in the apparatus shown in Figs. 1-12 by forming each lever $b^1$ with an operative tail piece $b^5$ and a locking tail piece $b^6$ arranged out of line with one another to enter two separate slots or spaces $b^7$, $b^8$ respectively in the slide C. The locking tail piece $b^6$ bears against a solid portion of the slide C when the latter is in its rearward position as shown in Fig. 6 and maintains a circumferential portion $b^9$ in contact with a step $b^{10}$ on the bomb suspending lever with the result that the latter is locked in its holding position. The slide C rests upon the side plates $b^2$ and is prevented from upward displacement by runners $C^1$ carried by the side plates $b^2$. The initial forward movement of the slide C removes the solid portion from the locking tail piece as shown in Fig. 7 and presents the slot or space $b^8$ through which such tail piece can enter or pass with the result that the lock is released. Further forward movement of the slide causes a solid portion to actuate the operating tail piece $b^5$ to turn the lever $b^1$ on its pivot and withdraw its locking surface $b^9$ from the step $b^{10}$ on the bomb suspending lever $b$ as shown in Fig. 8 whereupon the weight of the bomb turns such lever until the bomb is released. Further successive movements of the slide successively release the other release gears appertaining to such slide until all its bombs have been released. To charge or recharge the release gears with bombs the control lever D Fig. 2, is moved back to its initial position thereby allowing the springs $c^x$ appertaining to the slides to return the latter to a position in which solid portions thereof engage the locking tail pieces $b^6$ and prevent further backward movement of the slides. In this position the locking tail pieces take the tension of the springs $c^x$ from the Bowden wire $c^4$ with the result that the latter together with the control lever D remain loose and indicate to the pilot that all the release units have not been properly cocked or recharged. As each bomb is lifted into position to hook its suspension loop $a$ on to its hook lever $b$ the said loop engages a nose $b^{11}$ on the bomb lever and turns the latter until the step $b^{10}$ thereon is in position to be engaged by the locking surface $b^9$ whereupon a spring $b^{12}$ restores the latter to its locking position in relation to the bomb suspending lever and withdraws the locking tail piece out of its slot or space in the slide. When all the bombs appertaining to such slides have been hooked onto their respective levers and the latter latched, the slide is disengaged from all the locking tail pieces and the spring returns such slide to its initial position (Fig. 6) in which the solid portions of the slide engage the ends of the locking tail pieces $b^6$ and prevent the locking and releasing levers $b^1$ from being prematurely disengaged from the bomb suspending levers $b$. The return movement of the sliding bars to this position may bring an indicator into view bearing the words "Charged and locked" or any other appropriate words to show that this condition has been obtained. The operative connections above described between the slides and their respective levers can be so arranged that any program of bombs may be released as required. In the example shown in Fig. 1 the timing slots are so arranged that the first movement of the control lever after moving the slides to the free position, releases the first, second and third bombs in the first, second and third rows respectively, the second movement of the control lever, the second, third and fourth bombs in the first, second and third rows, and the third movement of the lever, the third, fourth and first bombs in the first, second and third rows and the fourth and last movement of the lever, the fourth, first and second bombs, in the first, second and third rows.

In the modification shown in Fig. 12 the slides C are actuated by a transverse bar $c^5$ engaging runners $c^3$ on the slides. This bar is connected to the control lever D by a Bowden wire $c^4$ passing over suitably arranged guide pulleys and is caused to receive a parallel motion by links $c^6$ pivoted at one end to the bar and at the other end to pivots $c^7$ on the beams $b^4$, the return movement of the bar being effected by springs $c^x$.

In the modification shown in Figs. 13 and 14 each locking and release lever is controlled by a single timing slot in place of two slots arranged out of line with one another in each slide as previously described. In this modification the operative tail piece $b^5$ and locking tail piece $b^6$ are still arranged out of line with one another but instead of the locking tail piece bearing against the slide when in its locking position it bears against a lug or projection $c^8$ on the underside of the slide. When the latter is moved to the free position the lug or projection clears the locking tail piece $b^6$ and when the slide is advanced to actuate the operative tail piece $b^5$ the lever $b^1$ is turned to release the hook lever $b$, the locking tail piece $b^6$ rising into proximity to the underside of the slide. On the return movement of the slide the abutment $c^8$ comes against the tail piece $b^6$ and prevents further backward movement of the slide until all the release gears have been recharged whereupon the slide spring returns the slide to its initial and locking position.

In a further development of this construction the separate locking tail piece is dispensed with and the operative tail piece in addition to passing through a slot in the slide is also adapted to engage with a solid portion of such slide when the latter is in its rearmost position. For this purpose the operative tail piece $b^5$ (Figs. 15 and 16) is formed on its underside with a lip $b^{13}$ which occupies a position above the slide C when the locking surface $b^9$ engages the step $b^{10}$, and when the slide is in its rearmost position (Fig. 15) this lip extends above a solid portion of the slide and prevents the bomb releasing lever from becoming unlocked. In this construction when the slide is drawn forward, it releases the lip $b^{13}$ and subsequently depresses the tail piece $b^5$ to release the locking device from the bomb suspending lever and allow the bomb to drop, continued movement of the slide causing a solid portion to pass over such tail piece as shown in Fig. 17 and retain the locking device in its released position. The complete return movement of the slide is prevented by a lug $c^8$ on the slide which engages the forward end of the tail piece when the latter is in the position shown in Fig. 17. When however a bomb is lifted into position to hook it onto its hook lever, a loop $a$ on the bomb engages the nose $b^{11}$ on the bomb lever and turns the latter until the locking device returns to its normal position with the tail piece above the slide. When all the locking devices have returned to this position the spring $c^x$ previously referred to, pulls the slide back to the end of its travel with the result that it secures all the locking devices in position against accidental displacement. This arrangement serves the double purpose of indicating to the pilot whether the cocking or recharging operations have been effected and whether the mechanism for holding the bombs is in its locked condition.

Referring to Fig. 18 it will be seen that the slides C are connected together by links $c^{10}$ arranged to give a three point suspension to prevent any one slide from being moved in advance of another and so insuring accurate timing of the releases. The central slide is connected by a link $c^{11}$ to one arm of an L lever $c^{12}$ pivoted at $c^{13}$. The other arm is attached by a snap joint connection $c^{14}$ to a link $c^{15}$ which is connected to one arm of an L lever $c^{16}$. The other arm of such lever is connected by a link $c^{17}$ to the slide C which controls the sighting bombs. The lever $c^{16}$ or the lever $c^{12}$, if the sighting bombs are dispensed with is connected by a Bowden wire $c^4$ to a control lever D (Figs. 22–24.) This lever works in a slotted gate plate $d$ which causes it to receive a step by step movement, accidental movement of the lever from any position to which it has been moved being prevented by a pawl $d^1$ engaging with a rack $d^2$ that is arranged in rigid connection with the lever.

The bomb release gear shown in Fig. 21 is adapted for use in connection with a cell case having six cells, the L lever $c^{12}$ being the same size and occupying the same position as the lever $c^{12}$ in Fig. 18 so that it can be coupled up to the lever $c^{16}$, or to the control lever D without the necessity for making adjustment. The beam and release gear appertaining to the sighting bombs are permanently fixed to the framework of the machine and are not removed with the beams appertaining to the cell cases.

What I claim as my invention and desire to secure by Letters Patent in the United States is:—

1. In apparatus for releasing bodies from aircraft, a locking and releasing unit comprising a body suspension lever, a combined locking and releasing lever pivoted between two side plates having rollers for guidance of a slide and guide slots for the passage of a loop by which the body is suspended from the suspension lever, the latter having a step and the locking and releasing lever a circumferential portion adapted to be maintained in contact therewith by a spring, and a tail piece adapted to interlock with the slide and also to be operated thereby to release the suspension lever.

2. In bomb release gear, a bomb suspending mechanism, a combined locking and releasing lever having a circumferential portion adapted to be engaged by the aforesaid mechanism and a slide which actuates, locks and releases such lever.

3. In bomb release gear, a bomb suspending mechanism, a release lever having an operative arm and a locking arm and a circumferential portion adapted to be engaged by the aforesaid mechanism and a slide having slots working in conjunction with the said operative arm and locking arm.

4. In bomb release gear, the combination of a slotted slide, a locking and release lever having an arm formed with a lip adapted to pass through a slotted portion of the slide and engage a solid portion thereof and a bomb suspending hook adapted to be locked and released by the locking and release lever.

5. In bomb release gear, releasing and locking apparatus from which the bombs are suspended, timing slides for actuating such apparatus in any predetermined manner, a control member for imparting movement to the slides, means for preventing the slides from returning to their initial positions until all the releasing and locking apparatus have been reset, and means for indicating to the pilot whether the resetting operations have been effected and whether the mechanism for holding the bombs is in its locked condition.

6. In bomb release gear, a plurality of timing slides, a connection for attaching such slides together in such manner that any one slide is prevented from being moved in advance of another.

7. In bomb release gear, a set of interchangeable bomb carrying beams, a series of timing slides carried by such beams, an L lever for actuating such slides, a link for actuating such L lever and a snap joint for detachably connecting the link with the L lever.

8. In bomb release gear, a beam adapted to carry a plurality of sighting bombs, a timing slide appertaining to such beam, a set of interchangeable beams adapted to carry a plurality of bombs, timing slides appertaining to such beams, two L levers, one for actuating the slides appertaining to the sighting bombs and the other for actuating the slides appertaining to the other bombs, a link for connecting the two L levers and a snap joint for connecting such link to the L lever appertaining to the slides belonging to the interchangeable set of beams.

In testimony whereof I affix my signature in presence of two witnesses.

ARTHUR HENRY GLEDHILL.

Witnesses:
G. P. APPLEYARD,
A. J. ROBINSON.